United States Patent
Ur et al.

(10) Patent No.: US 11,272,259 B1
(45) Date of Patent: Mar. 8, 2022

(54) REAL-TIME BIDDING BASED SYSTEM, METHOD, AND COMPUTER PROGRAM FOR USING IN-VIDEO ANNOTATIONS TO SELECT RELEVANT ADVERTISEMENTS FOR DISTRIBUTION

(71) Applicant: Amdocs Development Limited, Limassol (CY)

(72) Inventors: Shmuel Ur, Shorashim (IL); Sarit Chehanowitz, Tel Aviv (IL); Nir Fattal, Yehud-Monosson (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/986,034

(22) Filed: Aug. 5, 2020

(51) Int. Cl.
| | |
|---|---|
| *H04N 21/81* | (2011.01) |
| *H04N 21/84* | (2011.01) |
| *H04N 21/25* | (2011.01) |
| *H04N 21/2547* | (2011.01) |
| *H04N 21/2668* | (2011.01) |
| *H04N 21/234* | (2011.01) |

(52) U.S. Cl.
CPC ..... *H04N 21/812* (2013.01); *H04N 21/23418* (2013.01); *H04N 21/251* (2013.01); *H04N 21/2547* (2013.01); *H04N 21/2668* (2013.01); *H04N 21/84* (2013.01)

(58) Field of Classification Search
CPC .......... H04N 21/812; H04N 21/23418; H04N 21/251; H04N 21/2668; H04N 21/84; H04N 21/2547
See application file for complete search history.

(56) References Cited

U.S. PATENT DOCUMENTS

| | | | |
|---|---|---|---|
| 9,219,790 B1 * | 12/2015 | Filev ................ | H04N 21/25866 |
| 9,390,425 B2 * | 7/2016 | de Heer ............ | H04N 21/4331 |
| 2004/0003413 A1 * | 1/2004 | Boston ............. | H04N 21/25891 725/133 |
| 2004/0261096 A1 * | 12/2004 | Matz ................. | H04N 21/4542 725/28 |
| 2006/0212350 A1 * | 9/2006 | Ellis .................. | G06Q 30/0269 705/14.41 |
| 2006/0212897 A1 * | 9/2006 | Li ..................... | H04N 21/6125 725/32 |

(Continued)

OTHER PUBLICATIONS

Wikipedia, "Real-time bidding," Wikipedia, Jun. 2020, 3 pages, retrieved from https://en.wikipedia.org/wiki/Real-time_bidding.

(Continued)

*Primary Examiner* — Jefferey F Harold
*Assistant Examiner* — Timothy R Newlin
(74) *Attorney, Agent, or Firm* — Zilka-Kotab, P.C.

(57) ABSTRACT

As described herein, a system, method, and computer program are provided for using in-video annotations to select relevant advertisements for distribution to users. In use, one or more in-video annotations are automatically created for a video content, using video analysis of the video content. Also, the one or more in-video annotations included within the video content is identified. Additionally, real-time bidding is used to select an advertisement relevant to the video content, wherein the real-time bidding is performed based on the one or more in-video annotations. Further, the advertisement is presented in association with the video content.

19 Claims, 7 Drawing Sheets

(56) References Cited

U.S. PATENT DOCUMENTS

| | | | | |
|---|---|---|---|---|
| 2006/0218618 | A1* | 9/2006 | Lorkovic | H04N 21/4312 725/135 |
| 2007/0061363 | A1* | 3/2007 | Ramer | G06F 16/7867 |
| 2007/0136533 | A1* | 6/2007 | Church | G06Q 30/0277 711/137 |
| 2008/0046917 | A1* | 2/2008 | de Heer | H04N 21/23109 725/32 |
| 2008/0046924 | A1* | 2/2008 | Hood | H04N 21/252 725/36 |
| 2008/0195462 | A1* | 8/2008 | Magdon-Ismail | G06Q 30/0258 705/7.33 |
| 2008/0195664 | A1* | 8/2008 | Maharajh | H04L 67/306 |
| 2009/0172727 | A1* | 7/2009 | Baluja | H04N 21/812 725/34 |
| 2009/0193134 | A1* | 7/2009 | Moore | H04N 21/44222 709/231 |
| 2009/0199229 | A1* | 8/2009 | Gupta | H04N 21/252 725/32 |
| 2009/0222854 | A1* | 9/2009 | Cansler | H04N 21/23424 725/35 |
| 2009/0300670 | A1* | 12/2009 | Barish | H04N 7/17318 725/13 |
| 2010/0030647 | A1* | 2/2010 | Shahshahani | G06Q 30/0269 705/14.66 |
| 2010/0042749 | A1* | 2/2010 | Barton | G06Q 30/0251 710/1 |
| 2010/0162284 | A1* | 6/2010 | Robbins | H04N 21/44222 725/10 |
| 2010/0211636 | A1* | 8/2010 | Starkenburg | H04N 21/43615 709/203 |
| 2010/0251290 | A1* | 9/2010 | Kodialam | H04N 21/25883 725/34 |
| 2012/0002952 | A1* | 1/2012 | Anderson | H04N 21/4126 386/293 |
| 2013/0144725 | A1* | 6/2013 | Li | H04N 21/23424 705/14.66 |
| 2014/0259056 | A1* | 9/2014 | Grusd | H04N 21/8133 725/34 |
| 2015/0121418 | A1* | 4/2015 | Jain | H04N 21/812 725/32 |
| 2015/0281756 | A1* | 10/2015 | Soon-Shiong | H04N 21/6582 725/14 |
| 2017/0061214 | A1* | 3/2017 | Huang | H04N 5/23232 |
| 2018/0014077 | A1* | 1/2018 | Hou | H04N 21/26233 |
| 2018/0035148 | A1* | 2/2018 | Maria | H04N 21/2668 |
| 2020/0404390 | A1* | 12/2020 | Lieberman | H04N 21/2547 |

OTHER PUBLICATIONS

Wikipedia, "Object detection," Wikipedia, Jul. 2020, 4 pages, retrieved from https://en.wikipedia.org/wiki/Object_detection.

Dwibedi, D., "Video Understanding Using Temporal Cycle-Consistency Learning," Google AI Blog, Aug. 8, 2019, 6 pages, retrieved from https://ai.googleblog.com/2019/08/video-understanding-using-temporal.html.

Anyclip, "Ground-breaking technology for video impact," AnyClip, Luminous Ads, 2020, 12 pages, retrieved from https://www.anyclip.com/product/luminous-ads.

Valossa, "Use Cases," Valossa, 2020, 4 pages, retrieved from https://valossa.com/use-cases/.

Wikipedia, "Pay-per-click," Wikipedia, Jul. 2020, 6 pages, retrieved from https://en.wikipedia.org/wiki/Pay-per-click.

* cited by examiner

US 11,272,259 B1

REAL-TIME BIDDING BASED SYSTEM, METHOD, AND COMPUTER PROGRAM FOR USING IN-VIDEO ANNOTATIONS TO SELECT RELEVANT ADVERTISEMENTS FOR DISTRIBUTION

FIELD OF THE INVENTION

The present invention relates to real-time bidding based techniques for determining an advertisement that is relevant to a user.

BACKGROUND

Content providers have significant interest in determining advertisements that are relevant (e.g. personalized) to its users. For example, advertisements can be distributed to users by a content provider in exchange for payment by the advertisers. Advertisers are generally willing to pay content providers more when their advertisements are effective (e.g. consumed by users, clicked on by users, etc.). In even some cases, advertisers may only pay when their advertisements are clicked, thus emphasizing the need of content providers to select advertisements that are relevant to users.

Current techniques for determining relevant advertisements generally rely on user profiles, content profiles, and/or advertisement profiles. Current techniques may also rely on video content that is currently being, or has recently been, consumed by the user to determine additional content (e.g. an advertisement) that is relevant to that video content. With regard to these techniques, a summary of the video content may be relied upon to determine relevancy between the video content and the advertisement. However, video content summaries do not allow in-video features at specific time points within the video to be detected for the purpose of determining an advertisement relevant to those in-video features (e.g. which can be provided at or near the associated time points). Further, while in-video annotations may be provided manually, this technique is time consuming and does not work for news or other real-time online video content.

There is thus a need for addressing these and/or other issues associated with the prior art.

SUMMARY

As described herein, a system, method, and computer program are provided for creating and using in-video annotations to select relevant advertisements for distribution to users. In use, one or more in-video annotations are automatically created for a video content, using video analysis of the video content. Also, the one or more in-video annotations included within video content is identified. Additionally, real-time bidding is used to select an advertisement relevant to the video content, wherein the real-time bidding is performed based on the one or more in-video annotations. Further, the advertisement is presented in association with the video content.

DETAILED DESCRIPTION

Figure 1:
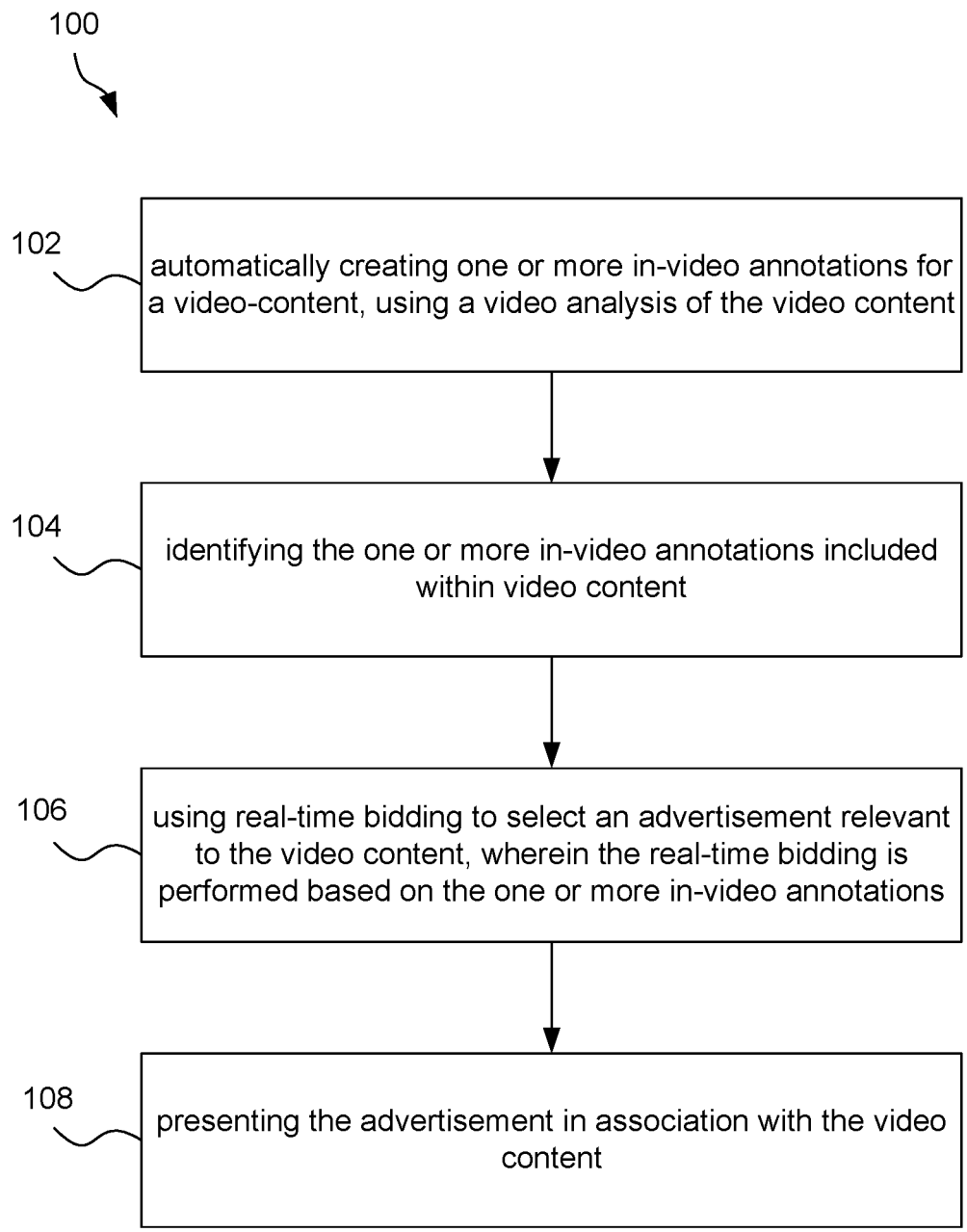
FIG. 1 illustrates a real-time bidding based method for using in-video annotations to select relevant advertisements for distribution to users, in accordance with one embodiment.

FIG. 1 illustrates a real-time bidding based method 100 for using in-video annotations to select relevant advertisements for distribution to users, in accordance with one embodiment. The method 100 may be performed by a system (e.g. server, etc.), such as a system of a content provider, and in particular a content service provider (CSP). The CSP is an entity, formed as a system architecture, which provides services to users. In the present embodiment, the services include at least a content distribution service, such as a media, television and/or streaming service. However, the services may additionally include communication services, such as an Internet service, a telephone service, etc.

The CSP has customers which are users of one or more services of the CSP. In one embodiment, the customers may each have an account with the CSP (i.e. may be subscriber to the one or more services of the CSP). The system may thus have access to information stored for its customers, such as account information, demographic information, service usage information, etc.

In operation 102, one or more in-video annotations are automatically created for a video content, using video analysis of the video content. In operation 104, the one or more in-video annotations included within the video content is identified. The video content may be a movie, television show, or any other video capable of being viewed by a user. In one embodiment, the video content may be real-time content (e.g. a news program) which cannot be annotated in advance (e.g. a by a content creator). Each in-video annotation may be an annotation (e.g. label) within the video content. For example, the in-video annotation may be associated with (e.g. tagged to) a frame of the video content. As another example, the in-video annotation may be associated with (e.g. tagged to) a particular time point within the video.

The in-video annotation describes a feature of the video content (e.g. a feature of the frame tagged with the annotation). For example, in-video annotation may indicate an object displayed in the video content, an action taken within the video content, a sentiment expressed in the video content, or any other feature of the video content.

As noted above, the in-video annotations are created automatically using a video analysis. The video analysis is a software application that operates to detect certain features in video content and add annotations to the video content at the exact locations of those features. In one embodiment, the video analysis may be provided, at least in part, by the content provider that provides the video content to users. In yet another embodiment, the video analysis may be provided, at least in part, by an advertiser, for execution by the content provider. Thus, the content provider and/or the advertiser may customize the types of annotations added to video content based on a configuration of the video analysis application.

In an additional embodiment, the video content may include one or more additional in-video annotations previously generated by a creator of the video content. These additional in-video annotations may be considered with the in-video annotations created by the video analysis, with respect to the remaining operations of the method 100 described below.

It should be noted that the in-video annotations may be automatically created at any point in time. For example, the video analysis may be performed on the video content only once to create the in-video annotations, and then the video content with the in-video annotations may be stored by the content provider for future use in the manner described below. As another example, the video analysis may be performed on the video content while the video content is live (e.g. streaming), which is especially applicable to video content that is not necessarily replayed (e.g. a news program, a sporting event, etc.).

In one embodiment, the in-video annotations may be identified, and thus the remaining operations of the method 100 performed, while a user is viewing the video content, for the purpose of presenting an advertisement to the user while the user is viewing the video content, as described in more detail below. In another embodiment, the in-video annotations may be identified, and thus the remaining operations of the method 100 performed, after a user views the video content, for the purpose of presenting the advertisement to the user after the user views video content, as also described in more detail below. In still yet another embodiment, the advertisement may be presented before the user views the video content, such as for video-on-demand (VOD) or a linear channel that has been selected for viewing by the user.

Additionally, as shown in operation 106, real-time bidding is used to select an advertisement relevant to the video content, wherein the real-time bidding is performed based on the in-video annotations. Real-time bidding refers to a process, which is entirely automated, in which advertisers bid on available impressions through which their advertisements can be presented. The impressions can be provided by the content provider, and are defined by specific locations in specific content, specific times in specific content, associated in-video annotations, specific users, or any other desired parameters.

Advertisers are notified of an available impression. Each advertiser wanting to have their advertisement presented through the particular impression places a bid for that impression, where the bid is an amount of money the advertiser is willing to spend to have its advertisement presented through the impression. The advertisers may use automated processes to submit bids, such as processes that evaluate the particular impression to generate a bid for a particular advertisement. The bids may be pay-per-impression bids in which the advertiser pays for presentation of the advertisement, or can be pay-per-click bids in which the advertiser pays when the user clicks on an advertisement being presented using the content impression, or can be any other payment model (e.g. pay-per-purchase).

During the real-time bidding process, one of bids is selected, which may be a highest bid or a bid that meets some other defined criteria, and the advertisement corresponding to the selected bid is presented through the impression. In this way, the real-time bidding may be a programmatic instantaneous auction for advertising.

As noted above, the real-time bidding of the present method 100 is performed specifically based on the in-video annotations. For example, a plurality of advertisers may be notified of a content impression available in association with the video content (i.e. to be presented during the video content or following the video content), where the notification indicates the in-video annotations, which may be a portion of the in-video annotations that are relevant to the impression (e.g. located at a same or similar time point in the video as the impression). In this way, the advertisers may take into consideration the in-video annotations when evaluating the impression to generate a bid to present a particular advertisement. In turn, the advertisers may ensure a relevancy of the advertisement to the in-video annotations, and thus relevancy to the video content or even specific time points within the video content. Bids for the content impression may then be received from the advertisers, where each bid corresponds with an advertisement of one of the advertisers, and one of the bids is selected and the corresponding advertisement is presented in association with the video content.

In additional embodiments, the real-time bidding may also be based on additional information. This additional information may be provided by the content provider to the advertisers in association with the request for bids on the available impression. The additional information may be associated with the video content with which the impression is associated. For example, the additional information may indicate a name of the video content, a type or genre of the video content, a device used by a user to watch the video content, a location at which the user is watching (or has watched) the video content, an identifier of a person that is watching (or has watched) the video content. In other examples, the additional information may include a user profile of a user to which the advertisement is to be presented, a device profile of a device on which the advertisement is to be presented, local activity occurring at a location in which the advertisement is to be presented, etc.

Further, as shown in operation 108, the advertisement is presented in association with the video content. As noted above, the advertisement is presented through the impression, and thus is presented in accordance with the definition of the impression (i.e. the location specified for the impression, etc.). Accordingly, the advertisement, having some relevancy to the video content, may be presented during the video content or following the video content.

In various exemplary embodiments, the video content may be temporarily stopped to present the advertisement, the advertisement may be presented next to the video content while the video content is being presented (e.g. in the bottom of the screen), or the advertisement may overlaid on the video content while the video content is being presented but on a portion of the video content which does not include a significant feature (e.g. character, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
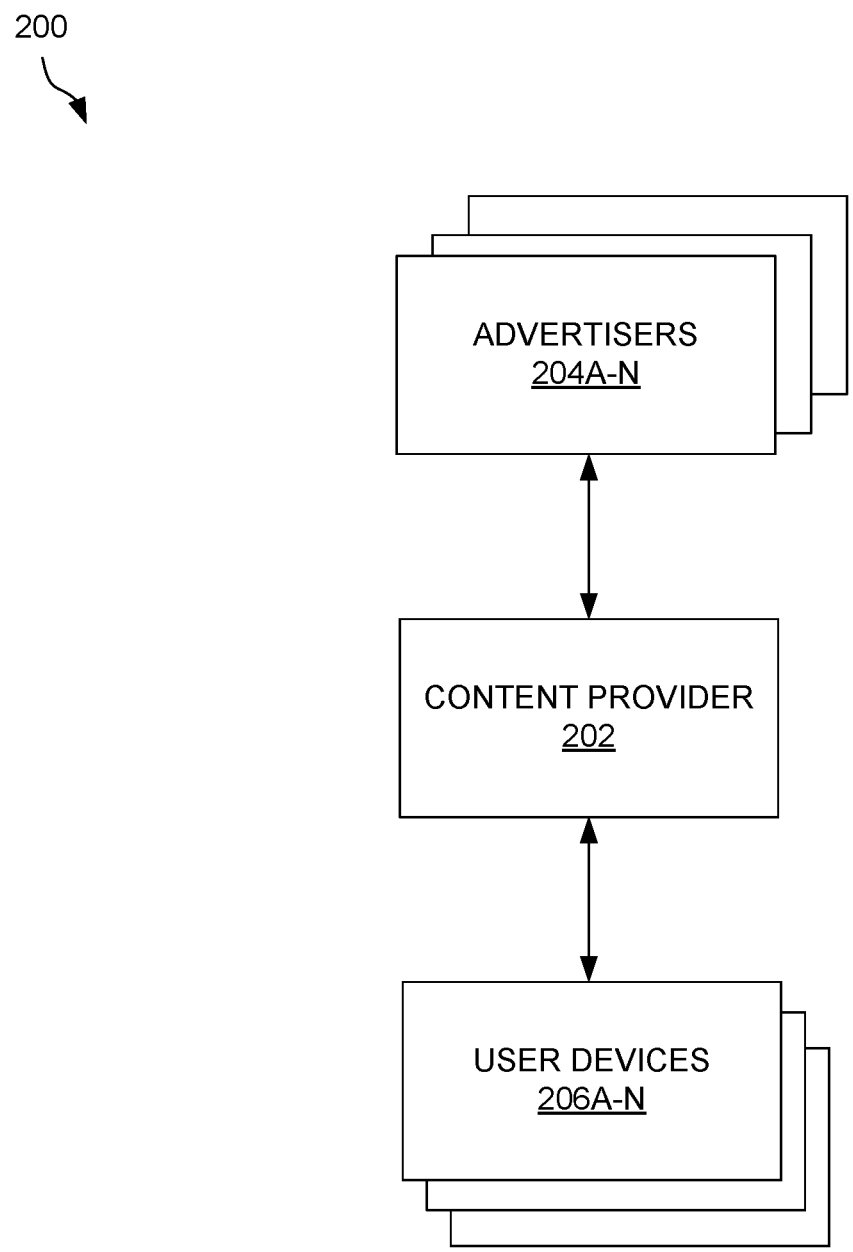
FIG. 2 illustrates a real-time bidding based system for using in-video annotations to select relevant advertisements for distribution to users, in accordance with one embodiment.

FIG. 2 illustrates a real-time bidding based system 200 for using in-video annotations to select relevant advertisements for distribution to users, in accordance with one embodiment. The system 200 may be implemented in the context of the details of the previous figure and/or any subsequent figure(s). Of course, however, the system 200 may be implemented in the context of any desired environment. Further, the aforementioned definitions may equally apply to the description below.

As shown, a content provider 202 is in communication with a plurality of advertisers 204A-N and a plurality of user devices 206A-N (e.g. via one or more networks). The advertisers 204A-N refers to systems (e.g. servers) forming an advertising entity. The user devices 206A-N refer to computing devices (e.g. mobile, etc.) used by users to consume (e.g. view) media.

The content provider 202 distributes media via a service to the user devices 206A-N. The user devices 206A-N are devices used by users (e.g. subscribers) to access the service of the content provider 202. The content provider 202 creates available impressions for the advertisers 204A-N to bid on to present their advertisements in association with the media being distributed.

For real-time bidding, a typical transaction begins with a user visiting a website. This triggers a bid request that can include various pieces of data such as the user's demographic information, browsing history, location, and the page being loaded. The request goes from the content provider 202 to an advertisement exchange, which submits it and the accompanying data to multiple advertisers 204A-N who automatically submit bids in real time to place their advertisements. Advertisers 204A-N bid on each advertisement impression as it is served. The impression goes to the highest bidder and their advertisement is served on the page.

The bidding happens autonomously and advertisers 204A-N set maximum bids and budgets for an advertising campaign. The criteria for bidding on particular types of users can be very complex, taking into account everything from very detailed behavioral profiles to conversion data. Probabilistic models can be used to determine the probability for a click or a conversion given the user history data (aka user journey). This probability can be used to determine the size of the bid for the respective advertising slot.

In one embodiment, the content provider 202 automatically creates in-video annotations for a video content, using a video analysis, and then identifies the in-video annotations included within video content when being distributed to one of the user devices 206A-N. The content provider 202 then uses real-time-bidding to select an advertisement relevant to the video content. The real-time-bidding is particularly performed based on the in-video annotations.

The real-time-bidding may also be performed based on other information provided to the advertisers 204A-N by the content provider 202, such as:

What is known about the use to receive the advertisement—for example salary, region, family status, age, political affiliation, hobbies, etc.

What is known about the user's intent—from the virtual (online) behavior of the user.

Virtual location of the user—the content of a location of a webpage in which an advertisement can be served. The content is scraped and analyzed automatically, and may be tracked over time.

Physical location of the user—the location of user is tracked, or more accurately the location of the user's smart phones is tracked. Location based advertisements may be served.

To this end, the advertisers 204A-N may bid on an impression based on various information associated with the user, the advertisement, and the related video content. Further, the content provider 202 presents the advertisement in association with the video content being distributed to the one of the user devices 206A-N.

In this way, the bidding is not based only on generic description of the video content, but on (e.g. real time) annotations of what happens in the video content. The content provider 202 can give a detailed description that is in the video clip on which to base the advertising (i.e. associated with the impression), which means the advertisers 204A-N can advertise based on what the person is watching, real time or not, with relevant advertisements.

Figure 3:
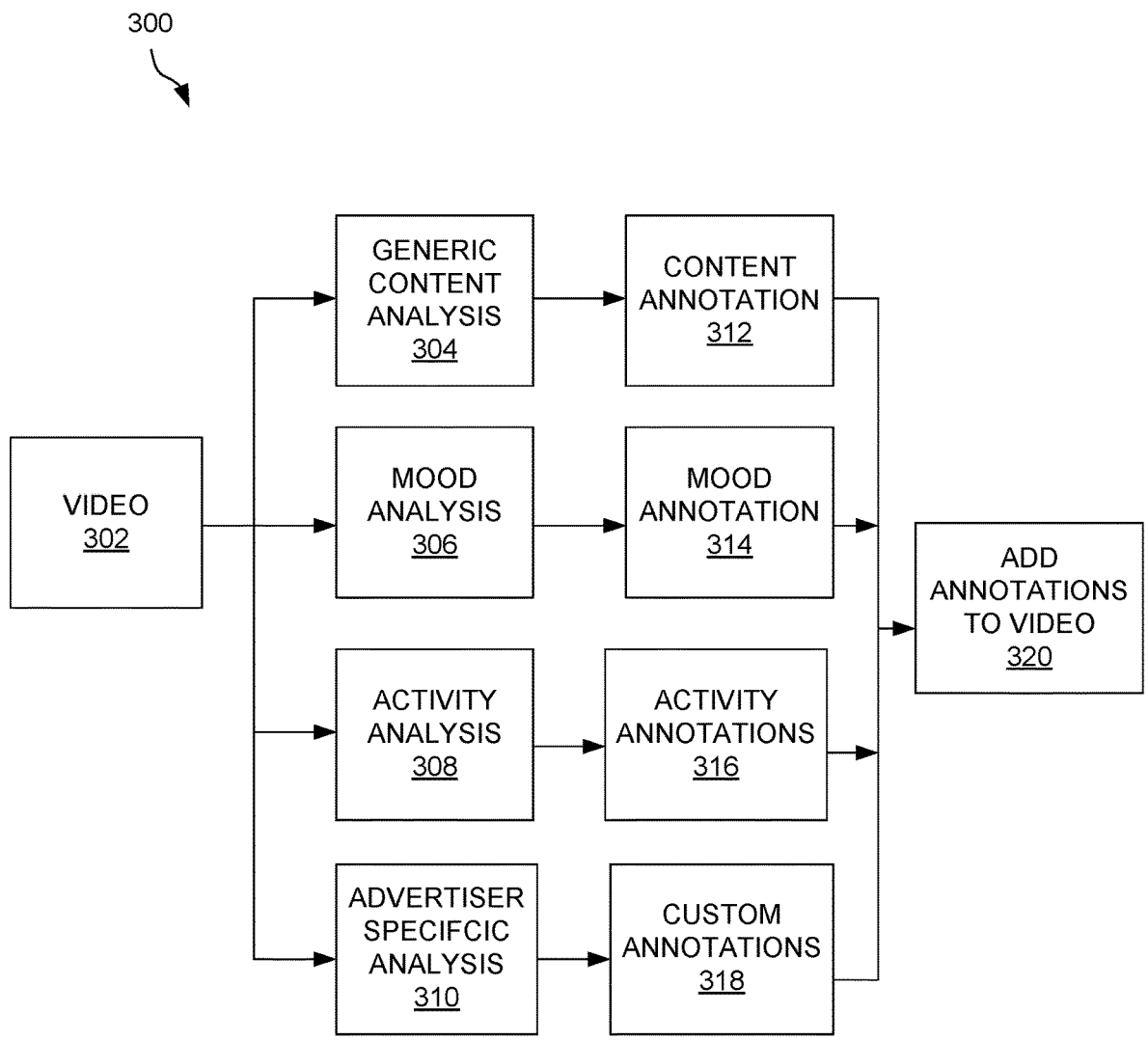
FIG. 3 illustrates a block diagram of a method for providing in-video annotations within video content, in accordance with one embodiment.

FIG. 3 illustrates a block diagram of a method 300 for providing in-video annotations within video content, in accordance with one embodiment. The method 300 may be carried out in the context of the details of the previous figure and/or any subsequent figure(s). Of course, however, the method 300 may be carried out in the context of any desired environment. Further, the aforementioned definitions may equally apply to the description below.

It should be noted that the method 300 may be carried out offline (e.g. before distribution of the video content), in one embodiment. In another embodiment, the method 300 may be carried out in real-time (i.e. during distribution of the video content).

As shown, a video 302 is identified. A generic content analysis 304 is performed on the video 302 to determine a summary of the content of the video 302. Content annotations (e.g. key words) are created that indicate the summary of the content of the video 302 (see 312). A mood analysis 306 is performed on the video 302 to determine a sentiment of the video 302. Mood annotations are created that indicate the mood/sentiment of the video 302 (see 314). An activity analysis 308 is performed on the video 302 to determine activities included in the video 302. Activity annotations are created that indicate the activities included in the video 302 (see 316). An advertiser specific analysis 310 is performed on the video 302 to determine advertiser specific annotations to add to the video 302. Custom annotations are created that indicate the advertiser specific annotations (see 318).

The video 302 is annotated with the annotations (see 320). Some may be added to the video 302 as a whole (e.g. content annotation, mood annotation), and others may be added at specific time points within the video 302 (e.g. activity annotations). Of course, any of the various types of of annotations may be added to the video 302 in any manner (i.e. as a whole or at specific time points).

Figure 4:
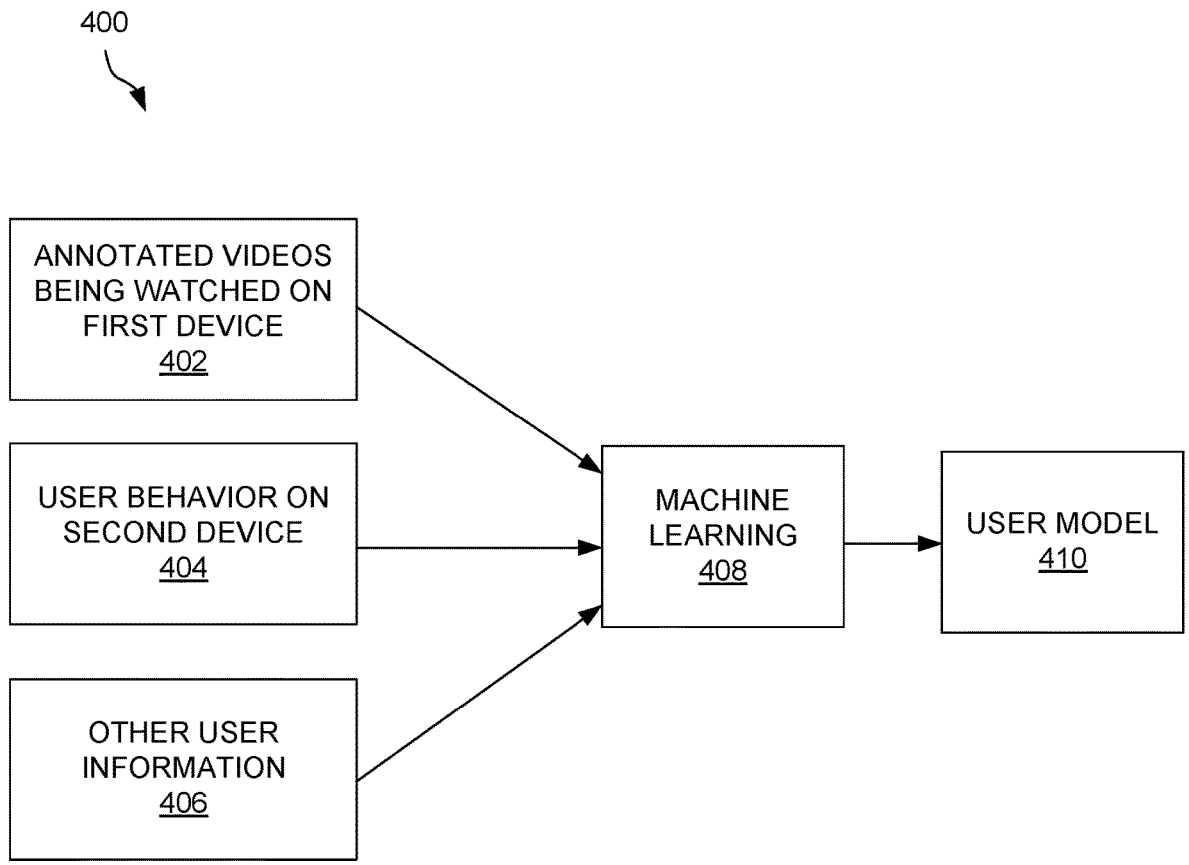
FIG. 4 illustrates a block diagram of a method for using machine learning to train a user model to infer a probability of a particular user clicking on an advertisement, in accordance with one embodiment.

FIG. 4 illustrates a block diagram of a method 400 for using machine learning to train a user model to infer a probability of a particular user clicking on an advertisement, in accordance with one embodiment. The method 400 may be carried out in the context of the details of the previous figure and/or any subsequent figure(s). For example, the method 400 may be carried out for pay-per-click based bids. Of course, however, the method 400 may be carried out in the context of any desired environment. Further, the aforementioned definitions may equally apply to the description below.

The pay-per-click model allows the advertisers specify how much they will pay for an impression, but will then only pay if the person watching clicks on the advertisement. In such case entities may bid different amounts for the impression, and the selected bid will depend on the probability the person will click on the advertisement. For example, assume the probability for a first advertisement bid at $20 is 50% and a second advertisement bid at $50 is 10%. In this case, the value of the first advertisement is $20*50% which equal $10$ and the value of the second advertisement is $50*10% which equals $5. As a result, the first advertisement is worth more because the probability is higher. To earn the money in a pay-per-click scenario, and to choose the best advertising, it is critical to have accurate probability calculations.

To obtain accurate probability calculations, a user model may be trained using machine learning to infer a probability of a particular user clicking on an advertisement. This training process is shown in the method 400. In particular, as shown in operation 402, a video (with in-video annotations and possibly other annotations) that is being watched by the user on a first user device is determined. In operation 404, user behavior on a second user device is also determined. The user behavior relates to activity of the user on the second user device occurring in parallel with the video being watched on the first user device. Operations 402 and 404 may be repeated for multiple different videos watched by the user at different times over any time period. Further, in operation 406, other user information is gathered.

The information gathered in operations 402-406 is input to a machine learning algorithm. The machine learning algorithm processes the input as shown in operation 408 to output a user model, as shown in operation 410. The user model can be used to infer a probability of the user clicking on a particular advertisement.

For example, assume the user, as she is watching the video, also has a second screen, a phone. Alternatively, she may be watching the video on the phone. As she is watching the video she is taking actions related to the video. She maybe making phone calls, she maybe going to website related to shopping, she maybe replying to advertisements she gets in the video.

The content provider is able to determine what the user sees in the video, since the content provider has access to the annotations, and is further able to monitor her reactions (as a result of a service provided by the content provider on the second device). The content provider can also monitor her reactions to the advertisements she sees.

Given this information, which the content provider has but no one else has, the content provider can create a machine learning model that finds the reaction to videos and advertisement and that can be used to improve advertisement targeting. The information the content provider has (e.g. what happens on the user's phone), the content provider is not allowed to share with advertisers. Accordingly, this information cannot be used in the pay-per-impression model. However, the content provider may select which advertisement to send to the user, and therefore this is a very important information for the content provider.

Figure 5:
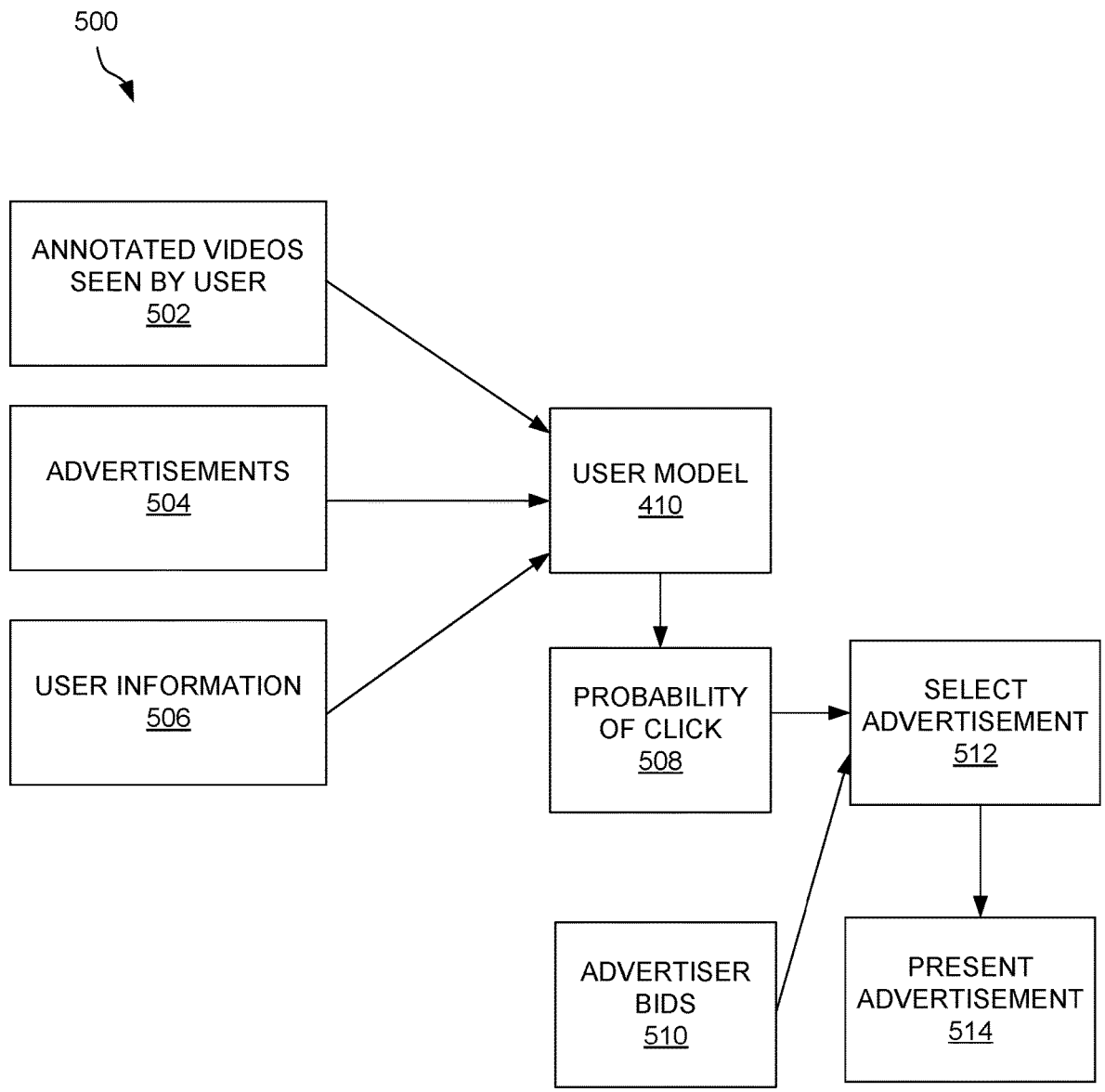
FIG. 5 illustrates a block diagram of a method for using the user model of FIG. 4 in combination with real-time bidding to select an advertisement to be distributed in association with video content, in accordance with one embodiment.

FIG. 5 illustrates a block diagram of a method 500 for using the user model of FIG. 4 in combination with real-time bidding to select an advertisement to be distributed in association with video content, in accordance with one embodiment. Thus, the method 500 may be carried out in the context of the method 400 of FIG. 4.

As shown in operation 502, annotated videos seen by the user are gathered. Additionally, advertisements are gathered in operation 504. Further, user information is gathered in operation 506. The information gathered in operations 502-506 is then input to the user model, as shown in operation 410. The user model infers a probability that the user will click on each of the advertisements, which is output from the user model as shown in operation 508. Based on the probabilities and bids received in operation 510 from advertisers to present certain advertisements through an available impression, an advertisement is selected 512. The advertisement that is selected may be the one with the highest combined values (multiplied) for the probability of being clicked and the bid, in one embodiment. The selected advertisement is then presented to the user, as shown in operation 514.

Figure 6:
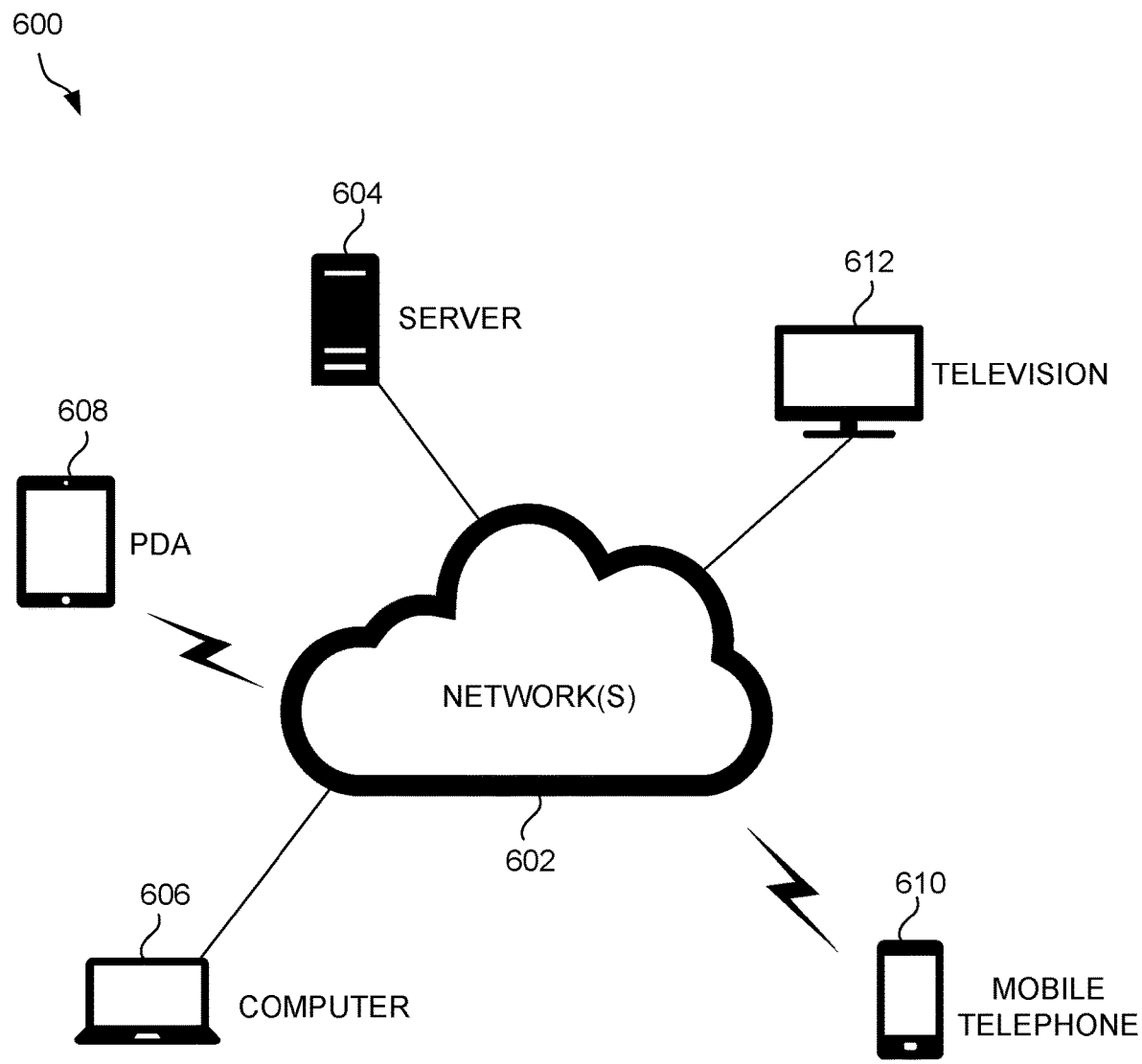
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
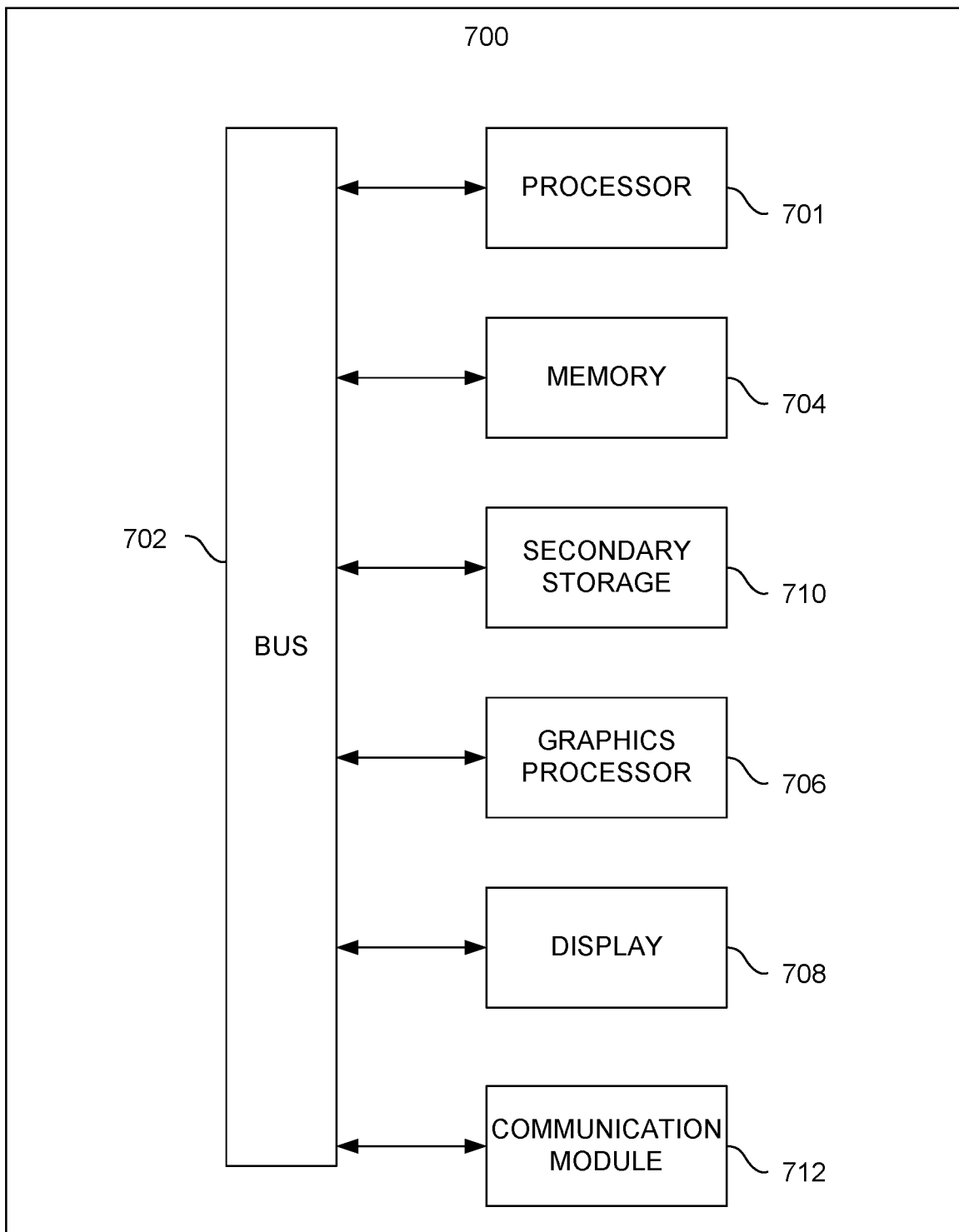
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
 generating training data for use in training a user model, the training data indicating:
  a plurality of existing videos each including existing in-video annotations describing video features,
  a plurality of advertisements presented in association with the plurality of videos, and
  activity of a plurality of users while watching the plurality of advertisements and while watching the plurality of existing videos including user reactions corresponding to the video features;

inputting the training data to a machine learning algorithm for training the user model to infer a probability of a user clicking on an advertisement;

automatically creating one or more in-video annotations for a video content, using video analysis of the video content;

identifying the one more in-video annotations included within the video content;

selecting an advertisement relevant to the video content, wherein the advertisement is selected based on:

bids received for a plurality of advertisements using a real-time bidding process performed based on the one or more in-video annotations, and a probability, determined using the user model, of a particular user clicking on each advertisement of the plurality of advertisements corresponding to the bids; and presenting the selected advertisement in association with the video content.

2. The non-transitory computer readable medium of claim 1, wherein the video content further includes one or more additional in-video annotations generated by a creator of the video content, and wherein the one or more additional in-video annotations are identified for use in the real-time bidding.

3. The non-transitory computer readable medium of claim 1, wherein the video analysis is provided, at least in part, by a content provider that provides the video content to users.

4. The non-transitory computer readable medium of claim 1, wherein the video analysis is provided, at least in part, by an advertiser for use by a content provider in creating the one or more in-video annotations.

5. The non-transitory computer readable medium of claim 1, wherein each of the one or more in-video annotations is an annotation associated with a frame of the video content.

6. The non-transitory computer readable medium of claim 1, wherein each of the one or more in-video annotations indicates an object displayed in the video content.

7. The non-transitory computer readable medium of claim 1, wherein each of the in-video annotations indicates an action taken within the video content.

8. The non-transitory computer readable medium of claim 1, wherein each of the in-video annotations indicates a sentiment expressed in the video content.

9. The non-transitory computer readable medium of claim 1, wherein the real-time bidding is further performed based on a user profile of a user to which an advertisement is to be presented.

10. The non-transitory computer readable medium of claim 1, wherein the real-time bidding is further performed based on a device profile of a device on which an advertisement is to be presented.

11. The non-transitory computer readable medium of claim 1, wherein the real-time bidding is further performed based on local activity occurring at a location in which an advertisement is to be presented.

12. The non-transitory computer readable medium of claim 1, wherein the real-time bidding is performed by:

notifying a plurality of advertisers of a content impression available in association with the video content, wherein the notification indicates the one or more in-video annotations;

receiving, from the plurality of advertisers, bids for the content impression, wherein each bid corresponds with an advertisement of an advertiser of the plurality of advertisers; and selecting one of the bids to present the corresponding advertisement in association with the video content.

13. The non-transitory computer readable medium of claim 12, wherein the bids are to pay for an advertisement being presented using the content impression.

14. The non-transitory computer readable medium of claim 12, wherein the bids are to pay for a click on an advertisement being presented using the content impression.

15. The non-transitory computer readable medium of claim 1, wherein the method is performed while a user is viewing the video content for presenting the advertisement to the user while the user is viewing the video content.

16. The non-transitory computer readable medium of claim 1, wherein the method is performed after a user views the video content for presenting the advertisement to the user after the user views video content.

17. The non-transitory computer readable medium of claim 1, wherein the video analysis of the video content used to automatically create the one or more in-video annotations for the video content includes:

a generic content analysis that is performed to determine a summary of the video content, a mood analysis that is performed to determine a sentiment of the video content, an activity analysis that is performed to determine activities included in the video content, and an advertiser specific analysis that is performed to determine advertiser specific annotations to add to the video content.

18. A method, comprising:

generating training data for use in training a user model, the training data indicating:

a plurality of existing videos each including existing in-video annotations describing video features, a plurality of advertisements presented in association with the plurality of videos, and activity of a plurality of users while watching the plurality of advertisements and while watching the plurality of existing videos including user reactions corresponding to the video features;

inputting the training data to a machine learning algorithm for training the user model to infer a probability of a user clicking on an advertisement;

automatically creating one or more in-video annotations for a video content, using video analysis of the video content;

identifying the one more in-video annotations included within the video content;

selecting an advertisement relevant to the video content, wherein the advertisement is selected based on:

bids received for a plurality of advertisements using a real-time bidding process performed based on the one or more in-video annotations, and a probability, determined using the user model, of a particular user clicking on each advertisement of the plurality of advertisements corresponding to the bids; and presenting the selected advertisement in association with the video content.

19. A system, comprising:

a non-transitory memory storing instructions; and one or more processors in communication with the non-transitory memory that execute the instructions to perform a method comprising:

generating training data for use in training a user model, the training data indicating:

a plurality of existing videos each including existing in-video annotations describing video features,
a plurality of advertisements presented in association with the plurality of videos, and
activity of a plurality of users while watching the plurality of advertisements and while watching the plurality of existing videos including user reactions corresponding to the video features;
inputting the training data to a machine learning algorithm for training the user model to infer a probability of a user clicking on an advertisement;
automatically creating one or more in-video annotations for a video content, using video analysis of the video content;
identifying the one more in-video annotations included within the video content;
selecting an advertisement relevant to the video content, wherein the advertisement is selected based on:
bids received for a plurality of advertisements using a real-time bidding process performed based on the one or more in-video annotations, and
a probability, determined using the user model, of a particular user clicking on each advertisement of the plurality of advertisements corresponding to the bids; and
presenting the selected advertisement in association with the video content.

* * * * *